United States Patent
Seon et al.

(10) Patent No.: US 12,203,393 B2
(45) Date of Patent: Jan. 21, 2025

(54) VERTICAL TYPE ONCE-THROUGH HEAT RECOVERY STEAM GENERATOR AND COMBINED POWER GENERATION SYSTEM INCLUDING

(71) Applicant: DOOSAN ENERBILITY CO., LTD., Changwon (KR)

(72) Inventors: Chil Yeong Seon, Yongin (KR); Tae Woo Kim, Yongin (KR); Jin Il Kim, Changwon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 18/358,213

(22) Filed: Jul. 25, 2023

(65) Prior Publication Data
US 2024/0200473 A1    Jun. 20, 2024

(30) Foreign Application Priority Data
Dec. 15, 2022  (KR) .................. 10-2022-0176209

(51) Int. Cl.
*F01K 23/10* (2006.01)
*F02C 7/141* (2006.01)
*F02C 7/224* (2006.01)

(52) U.S. Cl.
CPC ............ *F01K 23/106* (2013.01); *F02C 7/141* (2013.01); *F02C 7/224* (2013.01)

(58) Field of Classification Search
CPC .............................. F01K 23/106; F22B 29/062
See application file for complete search history.

(56) References Cited

U.S. PATENT DOCUMENTS

| | | | | |
|---|---|---|---|---|
| 2,590,712 A | * | 3/1952 | Lacerenza | F22G 5/20 122/479.6 |
| 2,709,894 A | * | 6/1955 | Evans | F23R 3/60 60/757 |
| 3,035,556 A | * | 5/1962 | Brunner | F01K 7/22 122/479.7 |

(Continued)

FOREIGN PATENT DOCUMENTS

| | | |
|---|---|---|
| DE | 4126036 A1 | 2/1993 |
| EP | 0918151 A1 | 5/1999 |

(Continued)

OTHER PUBLICATIONS

EP EESR, dated Mar. 20, 2024.

*Primary Examiner* — Todd E Manahan
*Assistant Examiner* — Marc Amar
(74) *Attorney, Agent, or Firm* — Harvest IP Law, LLP (57) ABSTRACT

A vertical type once-through heat recovery steam generator (HRSG) capable of improving operational stability during rapid startup and lifetime of a steam turbine while reducing environmental pollution caused by emissions, and a combined power generation system including the HRSG are provided. The HRSG includes a medium-pressure section including a medium-pressure side desuperheater installed at the rear of a medium-pressure superheater to lower the temperature of the steam supplied to a medium-pressure steam turbine, and a high-pressure section including a high-pressure side desuperheater installed at the rear of a high-pressure superheater to lower the temperature of the steam supplied to a high-pressure steam turbine.

17 Claims, 7 Drawing Sheets

(56) References Cited

U.S. PATENT DOCUMENTS

| | | | | |
|---|---|---|---|---|
| 4,485,619 A * | 12/1984 | Moore | ................... | F02C 7/047 60/39.093 |
| 5,044,163 A | 9/1991 | Bruckner | | |
| 5,386,685 A * | 2/1995 | Frutschi | ................... | F02C 6/18 60/39.182 |
| 5,765,509 A * | 6/1998 | Liebig | ................... | F01K 23/106 122/420 |
| 6,041,588 A * | 3/2000 | Bruckner | ................ | F02C 7/224 60/39.182 |
| 6,145,295 A * | 11/2000 | Donovan | .............. | F01K 23/106 60/39.182 |
| 6,173,679 B1 * | 1/2001 | Bruckner | ............. | F22B 1/1815 122/451 S |
| 6,220,013 B1 * | 4/2001 | Smith | ................... | F01K 23/106 110/212 |
| 6,363,710 B1 | 4/2002 | Gebke | | |
| 6,715,450 B1 | 4/2004 | Wittchow | | |
| 2010/0236241 A1 | 9/2010 | Kumar | | |
| 2011/0247335 A1 * | 10/2011 | Schmid | ................... | F01K 23/10 122/1 R |
| 2013/0000272 A1 * | 1/2013 | Gulen | ................... | F02C 7/224 60/39.182 |
| 2013/0074508 A1 * | 3/2013 | Sholes | ................... | F02C 6/003 60/772 |
| 2015/0007575 A1 * | 1/2015 | Drouvot | ................ | F01K 17/025 60/39.182 |
| 2017/0211427 A1 * | 7/2017 | Taguchi | ................... | F02C 6/18 |
| 2018/0363557 A1 * | 12/2018 | Sumimura | ................ | F22D 1/14 |
| 2020/0173651 A1 * | 6/2020 | Hiat | .......................... | F01K 7/08 |
| 2020/0284169 A1 * | 9/2020 | Uechi | ..................... | F01K 7/223 |
| 2020/0332681 A1 * | 10/2020 | Uechi | ....................... | F01K 7/32 |
| 2021/0277806 A1 * | 9/2021 | Velloso Mohedano | ...................... | F02C 7/143 |
| 2022/0381158 A1 | 12/2022 | Duffy | | |
| 2023/0374920 A1 * | 11/2023 | Furukawa | ............. | F01K 23/101 |

FOREIGN PATENT DOCUMENTS

| | | |
|---|---|---|
| JP | 2001-214759 A | 8/2001 |
| JP | 2005-232966 A | 9/2005 |
| JP | 2017089623 A | 5/2017 |
| KR | 10-2001-0014388 A | 2/2001 |
| KR | 10-0417202 B1 | 4/2004 |
| KR | 10-0439080 B1 | 7/2004 |
| KR | 1020050068773 A | 7/2005 |
| KR | 2006063311 A * | 6/2006 |
| KR | 1020170075010 A | 6/2017 |
| KR | 10-1887971 B1 | 8/2018 |
| KR | 10-1946176 B1 | 2/2019 |
| KR | 20190067119 A | 6/2019 |
| KR | 1020200130449 A | 11/2020 |
| KR | 10-2445324 B2 | 9/2022 |
| WO | WO-2022070960 A1 * | 4/2022 ............. F01D 19/00 |

\* cited by examiner

VERTICAL TYPE ONCE-THROUGH HEAT RECOVERY STEAM GENERATOR AND COMBINED POWER GENERATION SYSTEM INCLUDING

CROSS REFERENCE TO RELATED APPLICATION

The present application claims priority to Korean Patent Application No. 10-2022-0176209, filed on Dec. 15, 2022, the entire contents of which are incorporated herein for all purposes by this reference.

BACKGROUND OF THE INVENTION

1. Field of the Invention

The present disclosure relates to a vertical type once-through heat recovery steam generator (HRSG) capable of improving operational stability during rapid startup and lifetime of a steam turbine while reducing environmental pollution caused by emissions, and a combined power generation system including the same.

2. Description of the Background Art

A combined power generation system is a power generation system in which primary and secondary power generation facilities are combined. In general, a combined power generation system operates such that fuel is combusted inside a gas turbine to produce high-temperature combustion gases, which rotate the gas turbine to generate primary power, and a steam turbine is driven to generate secondary power with high-temperature and high-pressure steam generated by using heat of exhaust gases discharged from the primary power generation process.

This combined power generation system has advantages including highly efficient energy utilization and a short time of startup for power generation. The highly efficient energy utilization is achieved by usage of combustion heat of fuel, which is primarily utilized in a gas turbine, and is recycled in a heat recovery steam generator (HRSG). The short time for power generation is achieved by the HRSG system's rapid startup process from startup to power generation. In addition, the combined power generation system can use clean fuel, which is eco-friendly than other fuels.

The heat of exhaust gases that produce high-temperature, high-pressure steam may be recovered by the HRSG. HRSG is a type of heat exchanger.

HRSGs may be broadly categorized into horizontal and vertical types depending on a flow direction of exhaust gases. The horizontal type has the configuration in which exhaust gases flow in a horizontal direction, while the vertical type has the configuration in which exhaust gases flow in a vertical direction. The vertical type HRSG has the advantage of a smaller installation area compared to the horizontal type.

Meanwhile, HRSGs may be broadly categorized into a natural circulation type and a forced circulation type depending on the circulation method utilized in HRSGs. The natural circulation type is a type in which circulation is performed by density difference, and the forced circulation type is a type in which circulation of water or steam inside the HRSG is performed by a separately equipped circulation pump.

On the other hand, when the combined power generation system is started rapidly, an amount of steam generated by the HRSG increases rapidly during the start-up. However, rapidly increase in steam can lead to unstable operation and reduced overall power generation efficiency in the combined power generation system. In addition, there is another problem that a large amount of white smoke is generated due to the difference between the temperature of exhaust gases at an outlet of the HRSG and the ambient temperature.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide a vertical type once-through heat recovery steam generator (HRSG) and a combined power generation system including the same, which is capable of improving operational stability during rapid startup and lifetime of a steam turbine while reducing environmental pollution caused by emissions.

In an aspect of the present disclosure, there is provided a vertical type once-through heat recovery steam generator (HRSG) including: a low-pressure section including a condensate preheater configured to heat feedwater through heat exchange with combustion gases and supply the heated feedwater to a low-pressure drum, a low-pressure evaporator configured to heat feedwater stored in the low-pressure drum and convert the feedwater to steam, and a low-pressure superheater configured to heat the steam separated from the feedwater in the low-pressure drum and supply the heated steam to a low-pressure steam turbine; a medium-pressure section including a medium-pressure economizer configured to receive a portion of the feedwater heated by the condensate preheater, heat the feedwater through heat exchange with combustion gases, and supply the heated feedwater to a medium-pressure drum, a medium-pressure evaporator configured to heat the feedwater stored in the medium-pressure drum and convert the heated feedwater to steam, a medium-pressure superheater configured to heat the steam separated from the feedwater in the medium-pressure drum and supply the heated steam to a medium-pressure steam turbine, and a medium-pressure side desuperheater installed at the rear of the medium-pressure superheater to lower the temperature of the steam supplied to a medium-pressure steam turbine; and a high-pressure section including a high-pressure economizer configured to receive a portion of the feedwater heated by the condensate preheater and heat the feedwater through heat exchange with combustion gases, a multi-stage once-through evaporator configured to heat the feedwater heated by the high-pressure economizer through heat exchange with the combustion gases, a high-pressure superheater configured to heat the steam heated by the multi-stage once-through evaporator and supply the heated steam to a high-pressure steam turbine, and a high-pressure side desuperheater installed at the rear of the high-pressure superheater to lower the temperature of the steam supplied to the high-pressure steam turbine.

In the vertical type once-through HRSG according to an embodiment of the present disclosure, the low-pressure section may include a condensate preheater bypass configured to allow a portion of the feedwater to bypass the condensate preheater and flow to the low-pressure drum.

In the vertical type once-through HRSG according to an embodiment of the present disclosure, the medium-pressure section may include a first medium-pressure reheater, a first medium-pressure desuperheater, a second medium-pressure reheater, and a second medium-pressure desuperheater sequentially between the medium-pressure superheater and the medium-pressure steam turbine such that the steam heated in the medium-pressure superheater is supplied to the medium-pressure steam turbine through the first medium-pressure reheater, the first medium-pressure desuperheater, the second medium-pressure reheater, and the second medium-pressure desuperheater, wherein the first and second desuperheaters form the medium-pressure side desuperheater.

In the vertical type once-through HRSG according to an embodiment of the present disclosure, a feedwater line between the medium-pressure drum and the medium-pressure superheater may be supplied with steam heated by an external heater. Here, the external heater may be configured to generate steam through heat exchange of a portion of the feedwater with high-temperature compressed air compressed from a compressor of a gas turbine and supply the generated steam to the feedwater line.

In the vertical type once-through HRSG according to an embodiment of the present disclosure, the high-pressure superheater may include first and second high-pressure superheaters and the high-pressure side desuperheater may include first high-pressure desuperheater and second high-pressure desuperheater, wherein the first high-pressure superheater, the first high-pressure desuperheater, the second high-pressure superheater, and the second high-pressure desuperheater are disposed sequentially between the multi-stage once-through evaporator and the high-pressure steam turbine such that the steam heated in the multi-stage once-through evaporator is supplied to the high-pressure steam turbine through the first high-pressure superheater, the first high-pressure desuperheater, the second high-pressure superheater, and the second high-pressure desuperheater.

In the vertical type once-through HRSG according to an embodiment of the present disclosure, a steam separator may be disposed between the multi-stage once-through evaporator and the first high-pressure superheater to separate steam contained in the feedwater having flowed through the multi-stage once-through evaporator.

In the vertical type once-through HRSG according to an embodiment of the present disclosure, a portion of the feedwater heated in the high-pressure economizer may be supplied to a fuel preheater of a combustor through a fuel-preheating feedwater line.

In the vertical type once-through HRSG according to an embodiment of the present disclosure, the multi-stage once-through evaporator may include: an inlet part which receives feedwater; and a heat transfer tube having a front end connected to the inlet part and a rear end out of which steam is discharged such that the feedwater from the inlet part is evaporated through heat exchange with the combustion gases while flowing from the front end to the rear end, wherein the heat transfer tube may be formed such that an inner diameter of the rear end is larger than that of the front end.

In the vertical type once-through HRSG according to an embodiment of the present disclosure, the heat transfer tube may include a plurality of heat transfer tube parts having different inner diameters each increasing stepwise toward the rear end of the heat transfer tube.

In another aspect of the present disclosure, a combined power generation system including: a gas turbine including a compressor configured to suck and compress external air, a combustor configured to mix fuel with the compressed air and combust the mixture, and a turbine rotated by combustion gases discharged from the combustor to generate a rotational force; a heat recovery steam generator (HRSG) configured to heat feedwater and generate steam by using combustion gases discharged from the gas turbine; and a steam turbine in which blades are rotated by the steam generated from the HRSG to generate a rotational force. Here, the HRSG may include: a low-pressure section including a condensate preheater configured to heat feedwater through heat exchange with combustion gases and supply the heated feedwater to a low-pressure drum, a low-pressure evaporator configured to heat feedwater stored in the low-pressure drum and convert the feedwater to steam, and a low-pressure superheater configured to heat the steam separated from the feedwater in the low-pressure drum and supply the heated steam to a low-pressure steam turbine; a medium-pressure section including a medium-pressure economizer configured to receive a portion of the feedwater heated by the condensate preheater, heat the feedwater through heat exchange with combustion gases, and supply the heated feedwater to a medium-pressure drum, a medium-pressure evaporator configured to heat the feedwater stored in the medium-pressure drum and convert the heated feedwater to steam, a medium-pressure superheater configured to heat the steam separated from the feedwater in the medium-pressure drum and supply the heated steam to a medium-pressure steam turbine, and a medium-pressure side desuperheater installed at the rear of the medium-pressure superheater to lower the temperature of the steam supplied to a medium-pressure steam turbine; and a high-pressure section including a high-pressure economizer configured to receive a portion of the feedwater heated by the condensate preheater and heat the feedwater through heat exchange with combustion gases, a multi-stage once-through evaporator configured to heat the feedwater heated by the high-pressure economizer through heat exchange with the combustion gases, a high-pressure superheater configured to heat the steam heated by the multi-stage once-through evaporator and supply the heated steam to a high-pressure steam turbine, and a high-pressure side desuperheater installed at the rear of the high-pressure superheater to lower the temperature of the steam supplied to the high-pressure steam turbine.

In the combined power generation system according to an embodiment of the present disclosure, the low-pressure section may include a condensate preheater bypass configured to allow a portion of the feedwater to bypass the condensate preheater and flow directly to the low-pressure drum.

In the combined power generation system according to an embodiment of the present disclosure, the medium-pressure section may include a first medium-pressure reheater, a first medium-pressure desuperheater, a second medium-pressure reheater, and a second medium-pressure desuperheater sequentially between the medium-pressure superheater and the medium-pressure steam turbine such that the steam heated in the medium-pressure superheater is supplied to the medium-pressure steam turbine through the first medium-pressure reheater, the first medium-pressure desuperheater, the second medium-pressure reheater, and the second medium-pressure desuperheater, consecutively.

In the combined power generation system according to an embodiment of the present disclosure, a feedwater line between the medium-pressure drum and the medium-pressure superheater may be supplied with steam heated by an external heater. Here, the external heater may be configured to generate steam through heat exchange of a portion of the feedwater with high-temperature compressed air compressed from a compressor of a gas turbine and supply the generated steam to the feedwater line.

In the combined power generation system according to an embodiment of the present disclosure, the high-pressure superheater may include first and second high-pressure superheaters and the high-pressure side desuperheater may include first high-pressure desuperheater and second high-pressure desuperheater, wherein the first high-pressure superheater, the first high-pressure desuperheater, the second high-pressure superheater, and the second high-pressure desuperheater are disposed sequentially between the multi-stage once-through evaporator and the high-pressure steam turbine such that the steam heated in the multi-stage once-through evaporator is supplied to the high-pressure steam turbine through the first high-pressure superheater, the first high-pressure desuperheater, the second high-pressure superheater, and the second high-pressure desuperheater.

In the combined power generation system according to an embodiment of the present disclosure, a steam separator may be disposed between the multi-stage once-through evaporator and the first high-pressure superheater to separate steam contained in the feedwater having flowed through the multi-stage once-through evaporator.

In the combined power generation system according to an embodiment of the present disclosure, a portion of the feedwater heated in the high-pressure economizer may be supplied to a fuel preheater of a combustor through a fuel-preheating feedwater line.

In the combined power generation system according to an embodiment of the present disclosure, the multi-stage once-through evaporator may include: an inlet part which receives feedwater; and a heat transfer tube having a front end connected to the inlet part and a rear end out of which steam is discharged such that the feedwater from the inlet part is evaporated through heat exchange with combustion gases while flowing from the front end to the rear end, wherein the heat transfer tube may be formed such that an inner diameter of the rear end is larger than that of the front end.

In the combined power generation system according to an embodiment of the present disclosure, the heat transfer tube may include a plurality of heat transfer tube parts having different inner diameters each increasing stepwise toward the rear end of the heat transfer tube.

Details of other implementations of various aspects of the disclosure are included in the following detailed description.

According to embodiments of the present disclosure, it is possible to improve the operational stability during rapid startup and lifetime of the steam turbine while reducing environmental pollution caused by emissions.

DETAILED DESCRIPTION OF THE INVENTION

Hereinafter, exemplary embodiments of the present disclosure will be described in detail with reference to the accompanying drawings. However, it should be noted that the present disclosure is not limited thereto, and may include all modifications, equivalents, or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof. Hereinafter, a vertical type once-through heat recovery steam generator (HRSG) and a combined power generation system including the same according to embodiments of the present disclosure will be described with reference to the accompanying drawings.

Figure 1:
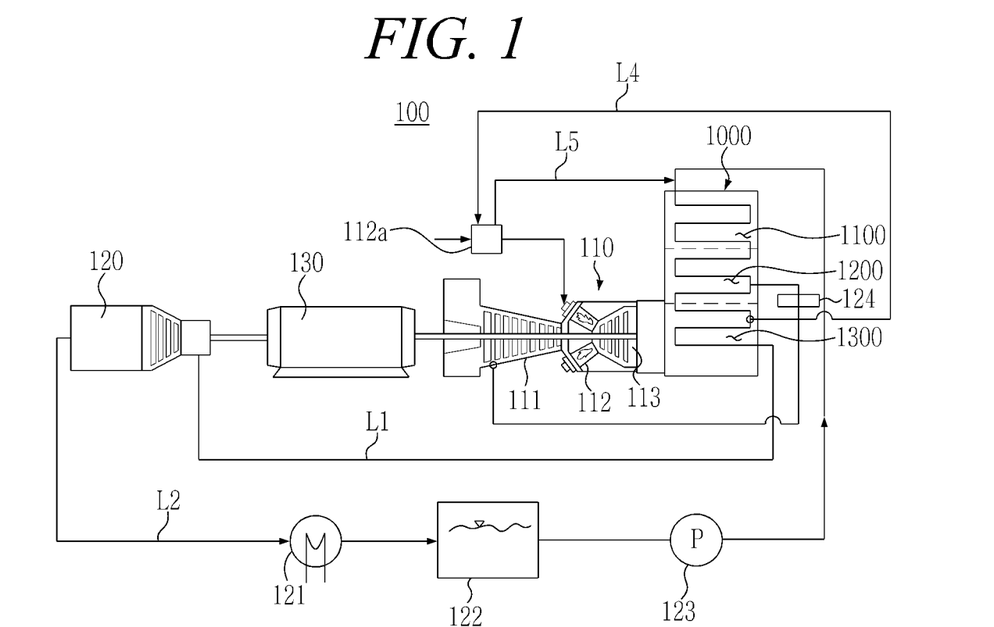
FIG. 1 is a diagram illustrating a combined power generation system according to an embodiment of the present disclosure.

FIG. 1 is a diagram illustrating a combined power generation system according to an embodiment of the present disclosure.

Referring to FIG. 1, the combined power generation system 100 may include a gas turbine 110, a steam turbine 120, a generator 130, and a heat recovery steam generator (HRSG) 1000. The steam turbine 120 may include a low-pressure steam turbine 120a, a medium-pressure steam turbine 120b, and a high-pressure steam turbine 120c.

The gas turbine 110 may serve to suck atmospheric air, compress the air to a high-pressure, burn an air-fuel mixture in static pressure conditions to release thermal energy, expand high-temperature combustion gases for conversion into kinetic energy, and then discharge exhaust gases containing the residual energy to the atmosphere.

The gas turbine 110 may include a compressor 111, a combustor 112, and a turbine section 113. The compressor 111 of the gas turbine 110 may suck and compress external air. The compressor 111 may serve both to supply the compressed air generated by compressor blades to the combustor 112 and to supply the cooling air to a high temperature region of the gas turbine 110. Here, since the sucked air undergoes an adiabatic compression process in the compressor 111, the air passing through the compressor 111 increases in pressure and temperature.

The compressor 111 is usually designed as a centrifugal compressor or an axial compressor, wherein the centrifugal compressor is applied to a small-scale gas turbine, whereas a multi-stage axial compressor is applied to a large-scale gas turbine.

The combustor 112 may mix compressed air supplied from an outlet of the compressor 111 with fuel and combust the air-fuel mixture at a constant pressure to produce high-energy combustion gases.

High temperature, high-pressure combustion gases generated by the combustor 112 is supplied to the turbine section 113. A fuel preheater 112a receives fuel from a fuel supply via a fuel supply pipe, heats the fuel, and supplies the heated fuel to the combustor 112.

In the turbine section 113, the combustion gases undergo adiabatic expansion and impact and drive a plurality of blades arranged radially around a rotary shaft of the turbine section 113 so that heat energy of the combustion gases is converted into mechanical energy with which the rotary shaft is rotated. A portion of the mechanical energy obtained from the turbine section 113 is supplied as the energy required to compress the air in the compressor 111, and the rest is utilized as an available energy to drive the generator 130 to produce electric power.

The combustion gases discharged from the turbine section 113 is cooled through the HRSG 1000 and then discharged to the outside. The HRSG 1000 serves to not only cool the combustion gases, but also generate high-temperature and high-pressure steam using the heat of the combustion gases and deliver same to the steam turbine 120.

The steam generated in the HRSG 1000 is transmitted to the steam turbine 120 through a steam feed line L1, and feedwater cooled in the steam turbine 120 is transmitted to the HRSG 1000 through a turbine feedwater recovery line L2.

The steam turbine 120 rotates blades using the steam generated by the HRSG 1000 and transmits the rotational energy to the generator 130. The steam turbine 120 supplies the cooled steam back to the HRSG 1000.

Although the gas turbine 110 and the steam turbine 120 are exemplified in FIG. 1 as being connected to one generator 130, the present disclosure is not limited thereto. Rather, the gas turbine 110 and the steam turbine 120 may be disposed in parallel and/or connected to different generators.

The turbine feedwater recovery line L2 is connected with a condenser 121 for condensing steam, a condensate storage tank 122 for storing condensed feedwater, and a condensate pump 123 for supplying the condensed feedwater stored in the condensate storage tank 122 to the HRSG 1000.

The steam flowing in the HRSG 1000 may have at least two or three levels of pressure, and accordingly, the feedwater is pressurized to at least two or three pressure levels. In this embodiment, the HRSG 1000 is exemplified as having three levels of pressure.

Figure 2:
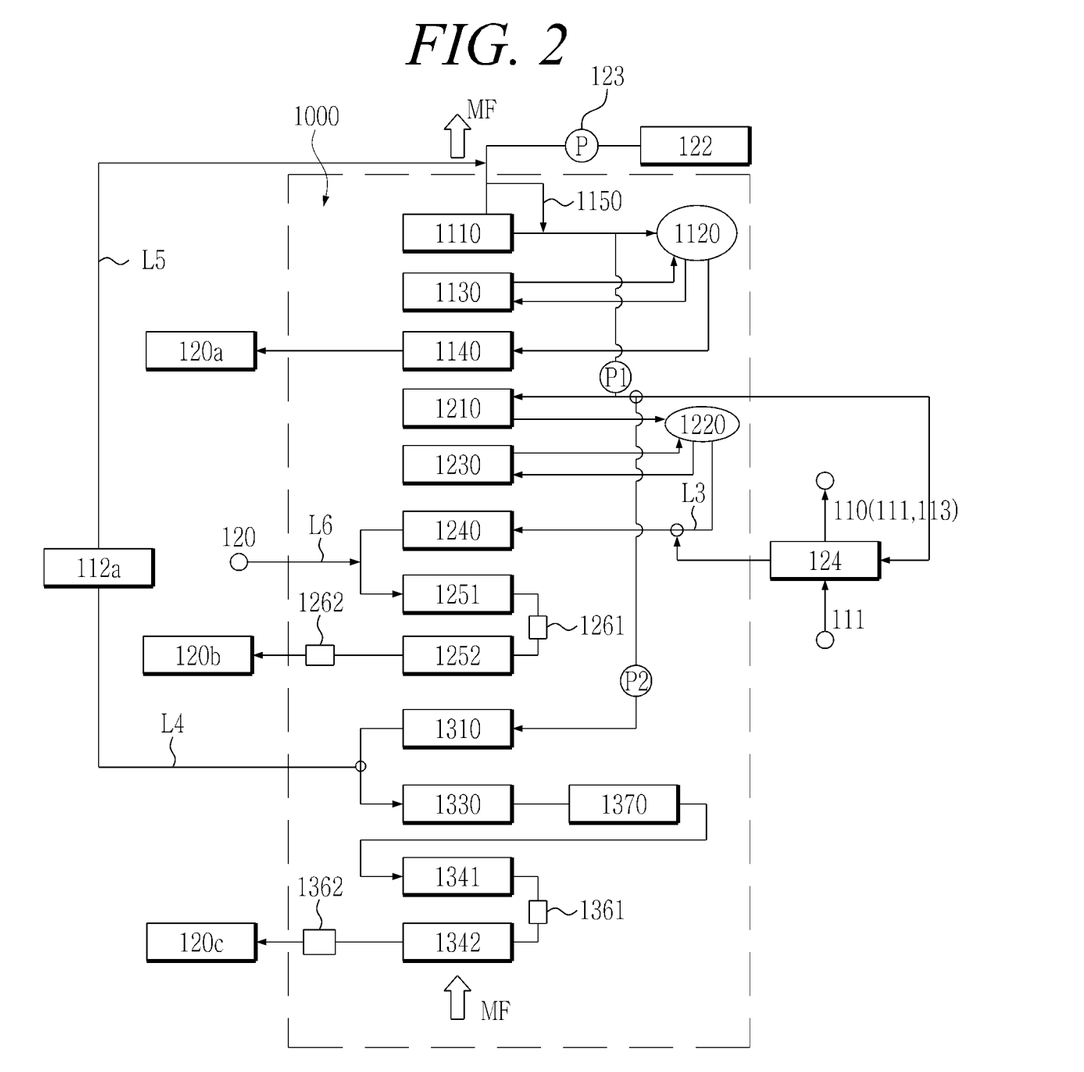
FIG. 2 is a diagram illustrating a vertical type once-through heat recovery steam generator (HRSG) according to an embodiment of the present disclosure.

FIG. 2 is a diagram illustrating a vertical type once-through heat recovery steam generator (HRSG) according to an embodiment of the present disclosure.

Referring to FIG. 2, the HRSG 1000 may include a low-pressure section 1100 having a relatively low-pressure, a medium-pressure section 1200 having a medium-pressure, and a high-pressure section 1300 having a relatively high-pressure.

The high-pressure section 1300 may be disposed adjacent to an inlet side of the HRSG, through which combustion gases are introduced, and may be heated by high-temperature combustion gases, and the low-pressure section 1100 may be disposed adjacent to an outlet side of the HRSG, through which the combustion gases are discharged, and may be heated by low-temperature combustion gases. The low-pressure section 1100 may be disposed vertically upward than the high-pressure section 1300.

The low-pressure section 1100 includes a condensate preheater 1110, a low-pressure drum 1120, a low-pressure evaporator 1130, a low-pressure superheater 1140, and a condensate preheater bypass 1150.

The condensate stored in the condensate storage tank 122 is transferred to the condensate preheater 1110 by a condensate pump 123, and the condensate preheater 1110 heats the condensate through heat exchange with combustion gases. The feedwater heated in the condensate preheater 1110 is supplied to the low-pressure drum 1120.

The low-pressure evaporator 1130 is connected to the low-pressure drum 1120 to heat the feedwater stored in the low-pressure drum 1120. The steam separated in the low-pressure drum 1120 is heated in the low-pressure superheater 1140, and then supplied to the low-pressure steam turbine 120*a*.

The condensate preheater bypass 1150 allows a portion of the condensate transferred from the condensate storage tank 122 bypass the condensate preheater 1110 and to flow directly to the low-pressure drum 1120. The bypassing portion of the condensate may be diverted from a pipe between the condensate pump 123 and the condensate preheater 1110 to a pipe between the condensate preheater 1110 and the low-pressure drum 1120. By letting a portion of the condensate bypass the condensate preheater 1110, the temperature of gases discharged through the outlet of the HRSG may be raised and thereby can prevent a large amount of white smoke from being produced.

The medium-pressure section 1200 includes a medium-pressure economizer 1210, a medium-pressure drum 1220, a medium-pressure evaporator 1230, a medium-pressure superheater 1240, a first reheater 1251, a second reheater 1252, a first desuperheater 1261, and a second desuperheater 1262. The medium-pressure section may further include a low-temperature reheating steam line L6 that reheats low-temperature steam discharged from the steam turbine 120. The first reheater 1251, a second reheater 1252, a first desuperheater 1261, and a second desuperheater 1262 of the medium-pressure section 1200 may be referred to as the first medium-pressure reheater 1251, a second medium-pressure reheater 1252, a first medium-pressure desuperheater 1261, and a second medium-pressure desuperheater 1262.

A portion of feedwater heated by the condensate preheater 1110, and/or a portion of the condensate that bypassed the condensate preheater 1110 through the condensate preheater bypass 1150 is supplied, by and through the medium-pressure pump P1, to the medium-pressure economizer 1210. The medium-pressure economizer 1210 heats the feedwater or condensate supplied from the medium-pressure pump P1 (hereinafter collectively referred to as "feedwater") through heat exchange with combustion gases. The feedwater heated in the medium-pressure economizer 1210 is supplied to the medium-pressure drum 1220. The medium-pressure evaporator 1230 is connected to the medium-pressure drum 1220 to heat the feedwater stored in the medium-pressure drum 1220. Specifically, the medium-pressure evaporator 1230 receives the feedwater from the medium-pressure drum 1220, heat the feedwater through heat exchange with combustion gases, and returns the heated feedwater to the medium-pressure drum 1220. The heated steam is separated from the medium-pressure drum 1220 and then heated in the medium-pressure superheater 1240. Then, the heated steam is supplied to the medium-pressure steam turbine 120*b*. While the heated steam is supplied from the medium-pressure superheater 1240 to the medium-pressure steam turbine 120*b*, the heated steam may pass through the first reheater 1251, the first desuperheater 1261, and the second reheater 1252, consecutively. The first reheater 1251, the first desuperheater 1261, and the second reheater 1252 regulate and adjust the temperature of the steam entering the medium-pressure steam turbine 120*b*. Between the medium-pressure superheater 1240 and the first reheater 1251, reheated steam from the medium-pressure superheater 1240 may be joined by the low-temperature reheating steam line L6, which reheats the low-temperature steam discharged from the steam turbine 120.

During rapid startup, the temperature of the steam entering the medium-pressure steam turbine 120b from the second reheater 1252 may rise rapidly, and this rapid rise is one of the factors that reduces the operational stability and the lifetime of the steam turbine during rapid startup. Thus, according to the present disclosure, a second desuperheater 1262 is additionally installed to reduce and adjust the temperature of the steam entering the medium-pressure steam turbine 120b from the second reheater 1252 during rapid startup. The second desuperheater 1262 is installed between the second reheater 1252 and the medium-pressure steam turbine 120b. According to an embodiment, the second desuperheater 1262 may not need to operate continuously throughout the entire operation of the HRSG, instead, it may be activated solely during rapid startup, and subsequently turned off after the rapid startup process is completed.

In addition, the feedwater line L3 between the medium-pressure drum 1220 and the medium-pressure superheater 1240 may be joined by steam heated by an external heater 124. The external heater 124 allows to generate steam through heat exchange of a portion of the feedwater supplied provided from the medium-pressure pump P1 using high-temperature compressed air compressed by the compressor 111, and the thereby generated steam is supplied to the feedwater line L3. The compressed air heat-exchanged in the external heater 124 is cooled to low temperature and returned to the gas turbine 110 to cool at least one of the compressor 111 and the turbine section 113. In this sense, the external heater 124 may also functions as an external cooler for the gas turbine 110.

The high-pressure section 1300 includes a high-pressure economizer 1310, a multi-stage once-through evaporator 1330, a high-pressure superheater 1340 (1341, 1342), a first desuperheater 1361, and a second desuperheater 1362. The first desuperheater 1361 and the second desuperheater 1362 of the high-pressure section 1300 may be referred to as the first high-pressure desuperheater 1361, and the second high-pressure desuperheater 1362.

A portion of feedwater heated by the condensate preheater 1110, and/or a portion of the condensate that bypassed the condensate preheater 1110 through the condensate preheater bypass 1150 is supplied, by and through a high-pressure pump P2, to the high-pressure economizer 1310, which heats the feedwater through heat exchange with combustion gases. According to an embodiment, the high-pressure economizer 1310 may be formed in multiple stages to heat the feedwater sequentially.

The feedwater heated by the high-pressure economizer 1310 is supplied to the multi-stage once-through evaporator 1330. The multi-stage once-through evaporator 1330 includes an inlet part 1331 into which feedwater flows in, and a heat transfer tube 1332 having a front end connected to the inlet part and a rear end out of which steam is discharged such that the feedwater from the inlet part 1331 is evaporated through heat exchange with combustion gases while flowing from the front end to the rear end. The heat transfer tube 1332 is formed such that an inner diameter of the rear end is larger than that of the front end. According to an embodiment, the heat transfer tube 1332 may be formed such that the inner diameter gradually increases from the front end toward the rear end. Such a multi-stage once-through evaporator 1330 may prevent static instability or Ledinegg instability caused by two-phase flow. The multi-stage once-through evaporator 1330 will described below furthermore in detail with reference to FIGS. 4 through 6.

Steam heated by the multi-stage once-through evaporator 1330 is supplied to the high-pressure steam turbine 120c through the first high-pressure superheater 1341, the first desuperheater 1361, and the second high-pressure superheater 1342, consecutively. The first high-pressure superheater 1341, the first desuperheater 1361, and the second high-pressure superheater 1342 regulate and adjust the temperature of the steam entering the high-pressure steam turbine 120c.

During rapid startup, the temperature of the steam entering the high-pressure steam turbine 120c from the second high-pressure superheater 1342 may rise rapidly, and this rapid rise is one of the factors that reduces operational stability and power generation efficiency during rapid startup. Therefore, according to the present disclosure, a second desuperheater 1362 may be additionally installed to reduce the temperature of the steam entering the high-pressure steam turbine 120c during rapid startup. The second desuperheater 1362 is installed between the second high-pressure superheater 1342 and the high-pressure steam turbine 120c. According to an embodiment, the second desuperheater 1362 may not need to operate continuously throughout the entire operation of the HRSG, instead, it may be activated solely during rapid startup, and subsequently turned off after the rapid startup process is completed.

During the rapid startup process, the multi-stage once-through evaporator 1330 may not convert all of the incoming feedwater to steam immediately. Instead, at the beginning of the rapid startup, only a portion of the feedwater may be converted to steam, while the remaining portion may still exist in a liquid form. Therefore, a steam separator 1370 may be installed at the rear end of the multi-stage once-through evaporator 1330 and before the first high-pressure superheater 1341 for steam-water separation at the beginning of the rapid startup.

That is, during a predetermined period of time at the beginning of the rapid startup, the feedwater that has flowed through the multi-stage once-through evaporator 1330 may flow through the steam separator 1370 and, after that, into the first high-pressure superheater 1341. After a predetermined period of time when the startup process is completed, only steam is supplied to the steam separator 1370, so the steam separator 1370 may function only as a connection channel between the multi-stage once-through evaporator 1330 and the first high-pressure superheater 1341.

A portion of the feedwater heated in the high-pressure economizer 1310 may be supplied to the fuel preheater 112a of the combustor 112 via the fuel preheating feedwater line LA. The high-temperature feedwater supplied to the fuel preheater 112a may be converted to cold feedwater after heating fuel through a heat exchange process, and returned to the condensate preheater 1110 through a return line L5.

The second desuperheater 1262 of the medium-pressure section 1200 and the second desuperheater 1362 of the high-pressure section 1300 serve to prevent a rapid temperature increase during rapid startup. This not only enhances operational reliability but also help protect the lifetime of the steam turbine from being reduced.

Figure 3:
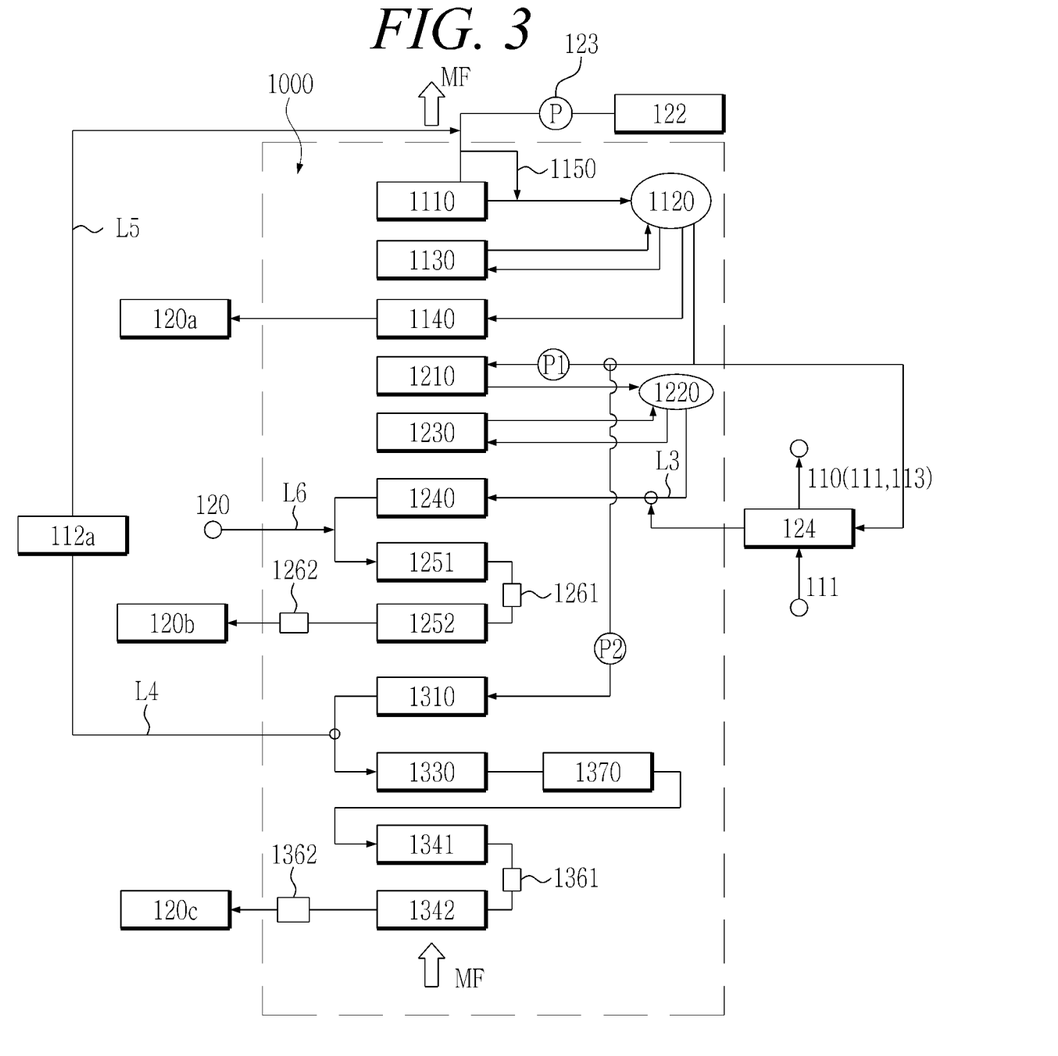
FIG. 3 is a diagram illustrating a vertical type once-through heat recovery steam generator (HRSG) according to another embodiment of the present disclosure.

Next, a vertical type once-through heat recovery steam generator (HRSG) according to another embodiment of the present disclosure will be described with reference to FIG. 3. FIG. 3 is a diagram illustrating the HRSG according to the embodiment of the present disclosure.

In the embodiment according to FIG. 2, the feedwater supplied to the medium-pressure economizer 1210 and the feedwater supplied to the high-pressure economizer 1310 are illustrated as being supplied from the front end of the low-pressure drum 1120 (in other words, from condensate preheater 1110 without the feedwater being entering the lower-pressure drum 1120) by and through the medium-pressure pump P1 or high-pressure pump P2, respectively.

However, alternatively, according to an embodiment as illustrated in FIG. 3, the feedwater supplied to the medium-pressure economizer 1210 and the feedwater supplied to the high-pressure economizer 1310 may be supplied from the rear end of the low-pressure drum 1120 (in other words, after the feedwater passing through the low-pressure drum 1120) to the medium-pressure economizer 1210 or the high-pressure economizer 1310, respectively and through by the medium-pressure pump P1 or high-pressure pump P2.

Next, a multi-stage perfusion-type evaporator 1330 will be described more in detail with reference to FIGS. 4 through 6.

Figure 4:
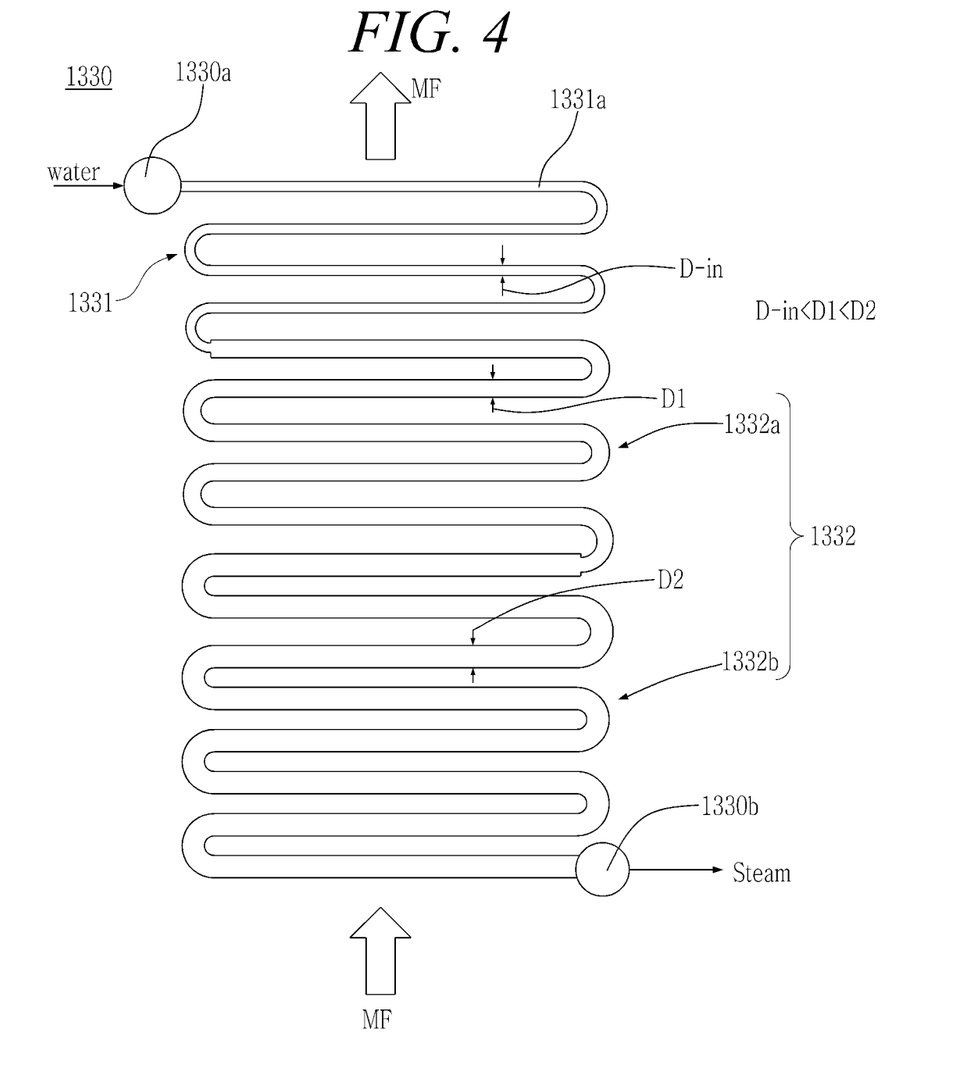
FIG. 4 is a diagram illustrating a multi-stage once-through evaporator according to an embodiment of the present disclosure.
Figure 5:
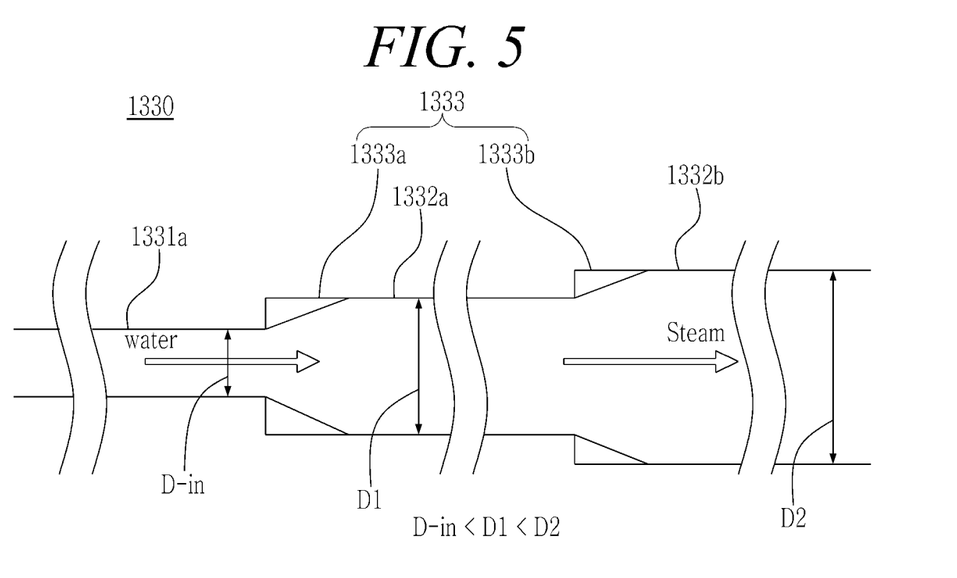
FIG. 5 is an enlarged cross-sectional view illustrating the multi-stage once-through evaporator of FIG. 4.
Figure 6:
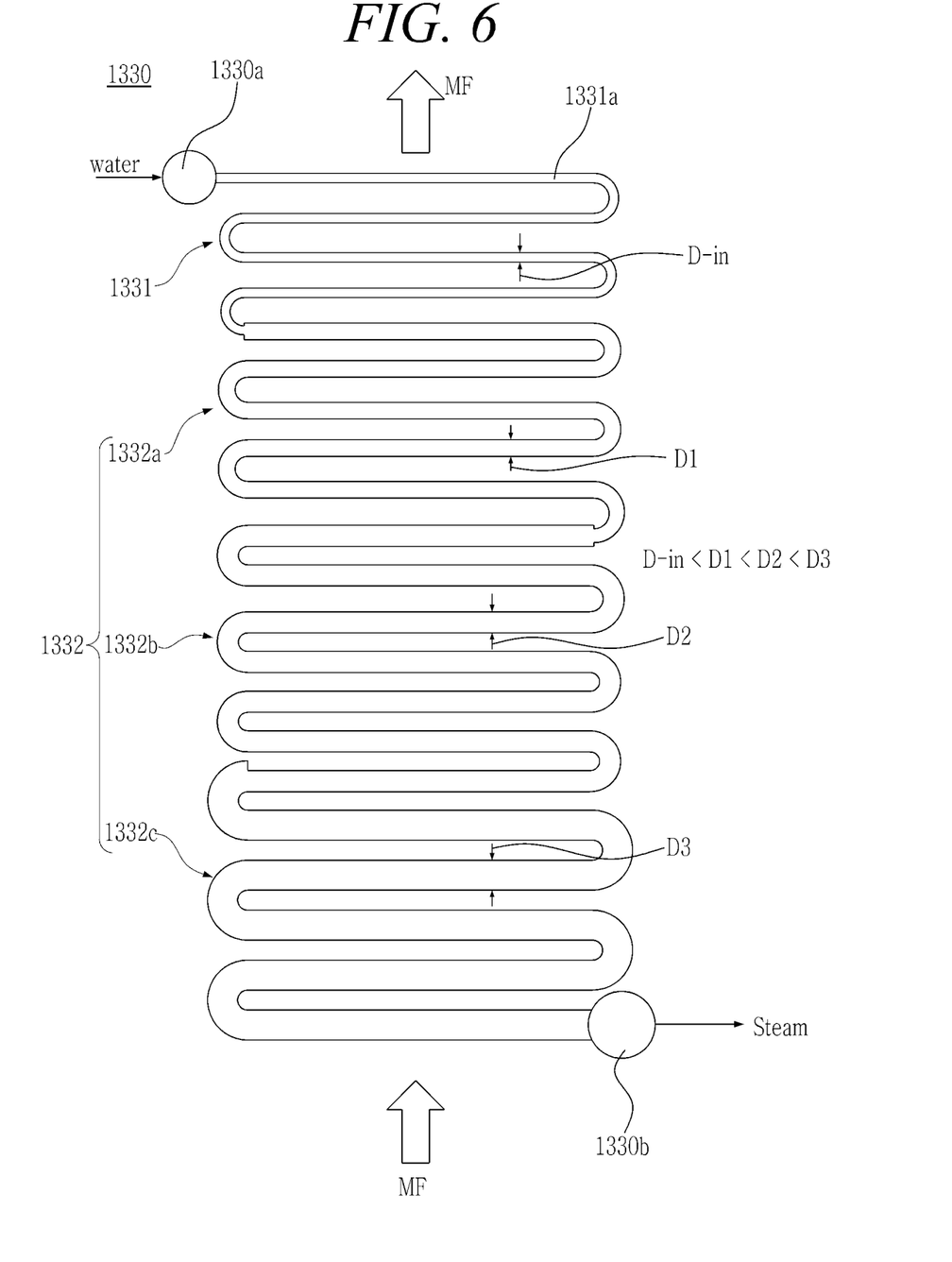
FIG. 6 is a diagram illustrating a variant of the multi-stage once-through evaporator.

FIG. 4 is a diagram illustrating a multi-stage once-through evaporator according to an embodiment of the present disclosure, FIG. 5 is an enlarged cross-sectional view of the multi-stage once-through evaporator of FIG. 4, and FIG. 6 is a diagram illustrating a variant of the multi-stage once-through evaporator.

Referring to FIGS. 4 and 5, the multi-stage once-through evaporator 1330 includes an inlet part 1331 and a heat transfer tube 1332, wherein the inlet part 1331 includes a small-diameter tube portion 1331*a*.

The inlet part 1331 is in a form of a tube through which feedwater is introduced from the high-pressure economizer 1310. An inlet header 1330*a* may be disposed at the inlet part 1331, which has an inner diameter (D-in). The small-diameter tube portion 1331*a* may be a slender tube, an inner diameter of which may be the same with the inner diameter (D-in) of the inlet part. As the small-diameter tube portion 1331*a* is disposed, the pressure characteristic curve of the multi-stage once-through evaporator 1330 may change, which may improve flow instability within the multi-stage once-through evaporator 1330.

The heat transfer tube 1332 is a tube having a front end connected to the rear end of the inlet part 1331 and a rear end out of which steam is discharged. An outlet header 1330*b* may be disposed at the rear end of the heat transfer tube 1332. The front end of the heating tube 1332 is supplied with feedwater from the inlet part 1331, and the feedwater is evaporated by heat exchange with a flow of combustion gases stream MF while flowing to the rear end of the heat transfer tube 1332 and then discharged. The heat transfer tube 1332 may be formed such that the inner diameter of the rear end is larger than that of the front end.

Further, the inlet-side inner diameter D-in, which is the inner diameter of the small-diameter tube portion 1331*a*, may be configured to be smaller than the inner diameter of the heat transfer tube 1332. In other words, in the multi-stage once-through evaporator 1330, the inlet-side inner diameter D-in of the small-diameter tube portion 1331*a* of the inlet part 1331 may be smaller than the inner diameter of the front end of the heat transfer tube 1332, which in turn may be smaller than the inner diameter of the rear end of the heat transfer tube 1332.

The heat transfer tube 1332 may include a plurality of heat transfer parts having different inner diameters, each of which may be formed to increase stepwise from the front end of the heat transfer tube 1332 to the rear end of the heat transfer tube 1332. The heat transfer tube 1332 may include a first heat transfer tube part 1332*a* and a second heat transfer tube part 1332*b*.

The first heat transfer tube part 1332*a* is a heat transfer tube that has a first inner diameter D1 and whose front end is connected to the rear end of the inlet part 1331. The first inner diameter D1 is formed to be larger than the inlet-side inner diameter D-in. The second heat transfer tube part 1332*b* is a heat transfer tube that has a second inner diameter D2 and whose front end is connected to the rear end of the first heat transfer tuber part 1332*a*. The second inner diameter D2 is formed to be larger than the first inner diameter D1. That is, the inner diameter of the multi-stage once-through evaporator 1330 may progressively increase in sequential steps from the inlet part 1331 to the first heat transfer tube part 1332*a*, and further to the second heat transfer tube part 1332*b*.

A tapered part 1333 may be disposed between the small-diameter tube portion 1331*a* and the first heat transfer tube part 1332*a*, and between the first heat transfer tube part 1332*a* and the second heat transfer tube part 1332*b*. Specifically, a first tapered part 1333*a* may be disposed between the small-diameter tube portion 1331*a* and the first heat transfer tube part 1332*a*, and a second tapered part 1333*b* may be disposed between the first heat transfer tube part 1332*a* and the second heat transfer tube part 1332*b*. The tapered part 1333 has an inner diameter that increases gradually and gently toward a rear end thereof. The inclusion of the tapered part 1333 helps prevent a sudden and discontinuous increase in the inner diameter, which in turn prevents flow delamination and improve flow stability within the multi-stage once-through evaporator 1330. Furthermore, the tapered part 1333 may be formed in the form of a straight line or a rounded curve when viewed in its cross-section.

Further, according to an embodiment as illustrated in FIG. 6, the heat transfer tube 1332 may further include a third heat transfer tube part 1332*c*. The third heat transfer tube part 1332*c* is a heat transfer tube having a front end connected to a rear end of the second heat transfer tube part 1332*b* and whose inner diameter is a third inner diameter D3. The third inner diameter D3 is formed to be larger than the second inner diameter D2. In this case, the inner diameter of the multi-stage once-through evaporator 1330 may progressively increase in sequential steps from the inlet part 1331 to the first heat transfer tube part 1332*a* and the second heat transfer tube part 133*b* and further to the third heat transfer tube part 1332*c*. In addition to the two or three heat transfer tube parts described earlier, the heat transfer tube 1332 may include four or more heat transfer tube parts, each having a sequentially increasing inner diameter toward the rear end thereof. In other words, a heat transfer tube part disposed more rearward has a diameter larger than the one disposed more forward.

The flow stability of the multi-stage once-through evaporator 1330 will now be described in detail with reference to FIG. 7.

There may occur a pressure difference between the flow at the front end and the flow at the rear end of the multi-stage once-through evaporator 1330. This is referred to as a 'system pressure drop' or 'internal pressure drop'. The system pressure drop varies with a mass flow rate (i.e., a mass velocity-W). However, since water evaporates inside the multi-stage once-through evaporator 1330, a two-phase flow phenomenon may occur where water and steam flow together. The change in pressure drop of steam, which is a gas phase, is greater than the change in pressure drop of water, which is a liquid phase.

As a result, the system pressure drop curve is formed to have a ridge and a valley where the slope varies from positive to negative value and then to a positive value (see the thin solid line in FIG. 7) as the mass flow rate increases.

Meanwhile, a flow rate in the multi-stage once-through evaporator 1330 is determined by a pressure drop curve of the evaporator outer head. Here, the outer head is the head that provides a flow driving force, which may be determined by a height difference between the inlet header 1330a and the outlet header 1330b, or by a circulation pump or the like (see dashed line A in FIG. 7). More specifically, a flow rate in the multi-stage once-through evaporator 1330 is determined at the intersection between the system pressure drop curve and the pressure drop curve of the outer head.

Figure 7:
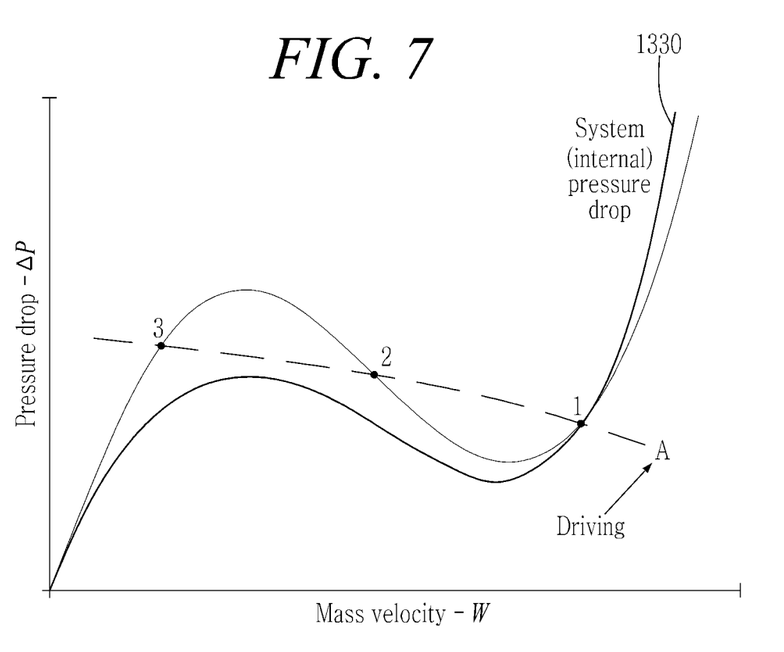
FIG. 7 is a graph illustrating a pressure drop characteristic curve of a heat recovery steam generator including the multi-stage once-through evaporator.

In the two-phase flow condition, there may be three intersections such as 1, 2, and 3, as illustrated in FIG. 7. In this case, a flow rate in the multi-stage once-through evaporator 1330 may be determined at any of the intersections 1 to 3. If a plurality of multi-stage once-through evaporators 1330 are arranged in parallel, a flow rate in the multi-stage once-through evaporators 1330 may be arbitrarily determined at any one of the intersection points of 1 to 3, rather than determined at a specified one intersection.

Accordingly, a mass flow rate different from an initially designed flow rate (intersection 1) may flow in the multi-stage once-through evaporator 1330. This flow instability is referred to as static instability (or Ledinegg instability). If a flow rate is less than an initially designed flow rate, a problem may arise in that steam may overheat excessively at the rear end of the multi-stage once-through evaporator 1330.

The multi-stage once-through evaporator 1330 according to the embodiments of the present disclosure may have a more gentle system pressure drop curve because the heat transfer tube 1332 is formed such that the inner diameter of the rear end is larger than that of the front end (see the bold solid line in FIG. 7). In this case, only one intersection (intersection 1) is formed between the system pressure drop curve and the pressure drop curve of the outer head, which may prevent static instability. Furthermore, as the inlet part 1331 includes the small-diameter tube portion 1331a, the system pressure drop curve is formed more gently so that the static instability phenomenon can be more reliably prevented.

While the embodiments of the present disclosure have been described, it will be apparent to those skilled in the art that various modifications and variations can be made in the present disclosure through addition, change, omission, or substitution of components without departing from the spirit of the disclosure as set forth in the appended claims, and such modifications and changes may also be included within the scope of the present disclosure. Also, it is noted that any one feature of an embodiment of the present disclosure described in the specification may be applied to another embodiment of the present disclosure.

The invention claimed is:

1. A vertical type once-through heat recovery steam generator (HRSG) comprising:
    a low-pressure section comprising a condensate preheater configured to heat feedwater through heat exchange with combustion gases and supply the heated feedwater to a low-pressure drum, a low-pressure evaporator configured to heat feedwater stored in the low-pressure drum and convert the feedwater to steam, and a low-pressure superheater configured to heat the steam separated from the feedwater in the low-pressure drum and supply the heated steam to a low-pressure steam turbine;
    a medium-pressure section comprising a medium-pressure economizer configured to receive at least a portion of the feedwater heated by the condensate preheater, heat the feedwater through heat exchange with the combustion gases, and supply the heated feedwater to a medium-pressure drum, a medium-pressure evaporator configured to heat the feedwater stored in the medium-pressure drum and convert the heated feedwater to steam, a medium-pressure superheater configured to heat the steam separated from the feedwater in the medium-pressure drum and supply the heated steam to a medium-pressure steam turbine, and a medium-pressure side desuperheater installed at the rear of the medium-pressure superheater to lower the temperature of the steam supplied to a medium-pressure steam turbine; and
    a high-pressure section comprising a high-pressure economizer configured to receive at least a portion of the feedwater heated by the condensate preheater and heat the feedwater through heat exchange with the combustion gases, a multi-stage once-through evaporator configured to heat the feedwater heated by the high-pressure economizer through heat exchange with the combustion gases, a high-pressure superheater configured to heat the steam heated by the multi-stage once-through evaporator and supply the heated steam to a high-pressure steam turbine, and a high-pressure side desuperheater installed at the rear of the high-pressure superheater to lower the temperature of the steam supplied to the high-pressure steam turbine,
    wherein the medium-pressure side desuperheater comprises a first medium-pressure desuperheater and a second medium-pressure desuperheater, and wherein the medium-pressure section comprises a first medium-pressure reheater, the first medium-pressure desuperheater, a second medium-pressure reheater, and the second medium-pressure desuperheater sequentially between the medium-pressure superheater and the medium-pressure steam turbine such that the steam heated in the medium-pressure superheater is supplied to the medium-pressure steam turbine through the first medium-pressure reheater, the first medium-pressure desuperheater, the second medium-pressure reheater, and the second medium-pressure desuperheater, consecutively,
    wherein the second medium-pressure desuperheater is deactivated after completion of a rapid startup process of the vertical type once-through HRSG while the first medium-pressure desuperheater remains active after the completion of the rapid startup process of the vertical type once-through HRSG, and,
    wherein the multi-stage once-through evaporator comprises:
        an inlet part which receives feedwater and includes a small-diameter tube portion; and
        a heat transfer tube having a first heat transfer tube part and a second heat transfer tube part, wherein a front end of the first heat transfer tube part is connected to the small-diameter tube portion and the first heat transfer tube part has a first inner diameter larger than an inner diameter of the small-diameter tube portion, and wherein a front end of the second heat transfer tube part is connected to the first heat transfer tube part and the second heat transfer tube part has a second inner diameter larger than the first inner diameter of the first heat transfer tube part, and wherein a first tapered part is disposed between the small-diameter tube portion and the first heat transfer tube part, and a second tapered part is disposed between the first heat transfer tube part and the second heat transfer tube part, and wherein each of the first and second tapered parts has an inner diameter that increases gradually and gently toward a rear end thereof.

2. The vertical type once-through HRSG according to claim 1, wherein the low-pressure section comprises a condensate preheater bypass configured to allow a portion of the feedwater to bypass the condensate preheater and flow directly to the low-pressure drum.

3. The vertical type once-through HRSG according to claim 1, wherein a feedwater line between the medium-pressure drum and the medium-pressure superheater is supplied with steam heated by an external heater.

4. The vertical type once-through HRSG according to claim 3, wherein the external heater is configured to generate steam through heat exchange of a portion of the feedwater with high-temperature compressed air compressed from a compressor of a gas turbine and supply the generated steam to the feedwater line.

5. The vertical type once-through HRSG according to claim 1, wherein the high-pressure superheater comprises first and second high-pressure superheaters and the high-pressure side desuperheater comprises first high-pressure desuperheater and second high-pressure desuperheater, wherein the first high-pressure superheater, the first high-pressure desuperheater, the second high-pressure superheater, and the second high-pressure desuperheater are disposed sequentially between the multi-stage once-through evaporator and the high-pressure steam turbine such that the steam heated in the multi-stage once-through evaporator is supplied to the high-pressure steam turbine through the first high-pressure superheater, the first high-pressure desuperheater, the second high-pressure superheater, and the second high-pressure desuperheater, consecutively.

6. The vertical type once-through HRSG according to claim 5, wherein a steam separator is disposed between the multi-stage once-through evaporator and the first high-pressure superheater to separate steam contained in the feedwater having flowed through the multi-stage once-through evaporator.

7. The vertical type once-through HRSG according to claim 1, wherein a portion of the feedwater heated in the high-pressure economizer is supplied to a fuel preheater of a combustor through a fuel-preheating feedwater line.

8. The vertical type once-through HRSG according to claim 1, wherein the heat transfer tube comprises a plurality of heat transfer tube parts having different inner diameters, each increasing stepwise toward the rear end of the heat transfer tube.

9. A combined power generation system comprising:
a gas turbine including a compressor configured to suck and compress external air, a combustor configured to mix fuel with the compressed air and combust the mixture, and a turbine rotated by combustion gases discharged from the combustor to generate a rotational force;
a heat recovery steam generator (HRSG) configured to heat feedwater and generate steam by using the combustion gases discharged from the gas turbine; and a steam turbine in which blades are rotated by the steam generated from the HRSG to generate a rotational force, the HRSG comprising:

a low-pressure section comprising a condensate preheater configured to heat feedwater through heat exchange with the combustion gases and supply the heated feedwater to a low-pressure drum, a low-pressure evaporator configured to heat feedwater stored in the low-pressure drum and convert the feedwater to steam, and a low-pressure superheater configured to heat the steam separated from the feedwater in the low-pressure drum and supply the heated steam to a low-pressure steam turbine;

a medium-pressure section comprising a medium-pressure economizer configured to receive at least a portion of the feedwater heated by the condensate preheater, heat the feedwater through heat exchange with the combustion gases, and supply the heated feedwater to a medium-pressure drum, a medium-pressure evaporator configured to heat the feedwater stored in the medium-pressure drum and convert the heated feedwater to steam, a medium-pressure superheater configured to heat the steam separated from the feedwater in the medium-pressure drum and supply the heated steam to a medium-pressure steam turbine, and a medium-pressure side desuperheater installed at the rear of the medium-pressure superheater to lower the temperature of the steam supplied to a medium-pressure steam turbine; and a high-pressure section comprising a high-pressure economizer configured to receive at least a portion of the feedwater heated by the condensate preheater and heat the feedwater through heat exchange with the combustion gases, a multi-stage once-through evaporator configured to heat the feedwater heated by the high-pressure economizer through heat exchange with the combustion gases, a high-pressure superheater configured to heat the steam heated by the multi-stage once-through evaporator and supply the heated steam to a high-pressure steam turbine, and a high-pressure side desuperheater installed at the rear of the high-pressure superheater to lower the temperature of the steam supplied to the high-pressure steam turbine, wherein the medium-pressure side desuperheater comprises a first medium-pressure desuperheater and a second medium-pressure desuperheater, and wherein the medium-pressure section comprises a first medium-pressure reheater, the first medium-pressure desuperheater, a second medium-pressure reheater, and the second medium-pressure desuperheater sequentially between the medium-pressure superheater and the medium-pressure steam turbine such that the steam heated in the medium-pressure superheater is supplied to the medium-pressure steam turbine through the first medium-pressure reheater, the first medium-pressure desuperheater, the second medium-pressure reheater, and the second medium-pressure desuperheater, consecutively, wherein the second medium-pressure desuperheater is deactivated after completion of a rapid startup process of the vertical type once-through HRSG while the first medium-pressure desuperheater remains active after the completion of the rapid startup process of the vertical type once-through HRSG and, wherein the multi-stage once-through evaporator comprises;

an inlet part which receives feedwater and includes a small-diameter tube portion; and a heat transfer tube having a first heat transfer tube part and a second heat transfer tube part, wherein a front end of the first heat transfer tube part is connected to the small-diameter tube portion and the first heat transfer tube part has a first inner diameter larger than an inner diameter of the small-diameter tube portion, and wherein a front end of the second heat transfer tube part is connected to the first heat transfer tube part and the second heat transfer tube part has a second inner diameter larger than the first inner diameter of the first heat transfer tube part, and wherein a first tapered part is disposed between the small-diameter tube portion and the first heat transfer tube part, and a second tapered part is disposed between the first heat transfer tube part and the second heat transfer tube part, and wherein each of the first and second tapered parts has an inner diameter that increases gradually and gently toward a rear end thereof.

10. The combined power generation system according to claim 9, wherein the low-pressure section comprises a condensate preheater bypass configured to allow a portion of the feedwater to bypass the condensate preheater and flow directly to the low-pressure drum.

11. The combined power generation system according to claim 9, wherein a feedwater line between the medium-pressure drum and the medium-pressure superheater is supplied with steam heated by an external heater.

12. The combined power generation system according to claim 11, wherein the external heater is configured to generate steam through heat exchange of a portion of the feedwater with high-temperature compressed air compressed from a compressor of a gas turbine and supply the generated steam to the feedwater line.

13. The combined power generation system according to claim 9, wherein the high-pressure superheater comprises first and second high-pressure superheaters and the high-pressure side desuperheater includes first high-pressure desuperheater and second high-pressure desuperheater, wherein the first high-pressure superheater, the first high-pressure desuperheater, the second high-pressure superheater, and the second high-pressure desuperheater are disposed sequentially between the multi-stage once-through evaporator and the high-pressure steam turbine such that the steam heated in the multi-stage once-through evaporator is supplied to the high-pressure steam turbine through the first high-pressure superheater, the first high-pressure desuperheater, the second high-pressure superheater, and the second high-pressure desuperheater, consecutively.

14. The combined power generation system according to claim 13, wherein a steam separator is disposed between the multi-stage once-through evaporator and the first high-pressure superheater to separate steam contained in the feedwater having flowed through the multi-stage once-through evaporator.

15. The combined power generation system according to claim 9, wherein a portion of the feedwater heated in the high-pressure economizer is supplied to a fuel preheater of the combustor through a fuel-preheating feedwater line.

16. The combined power generation system according to claim 9, wherein the heat transfer tube comprises a plurality of heat transfer tube parts having different inner diameters each increasing stepwise toward the rear end of the heat transfer tube.

17. The vertical type once-through HRSG according to claim 5, wherein the second high-pressure desuperheater is deactivated after the completion of the rapid startup process of the vertical type once-through HRSG while the first high-pressure desuperheater remains active after the completion of the rapid startup process of the vertical type once-through HRSG.

* * * * *